(12) United States Patent
McGrath, Jr.

(10) Patent No.: US 6,607,235 B2
(45) Date of Patent: Aug. 19, 2003

(54) SELF-DEPLOYING VEHICLE COVER WITH UNDERCARRIAGE TIGHTENING

(76) Inventor: Frederick T. McGrath, Jr., 165 Western Ave., #403, St. Paul, MN (US) 55102

(*) Notice: Subject to any disclaimer, the term of this patent is extended or adjusted under 35 U.S.C. 154(b) by 0 days.

(21) Appl. No.: 09/864,358

(22) Filed: May 23, 2001

(65) Prior Publication Data

US 2002/0145306 A1 Oct. 10, 2002

Related U.S. Application Data

(63) Continuation-in-part of application No. 09/777,414, filed on Feb. 6, 2001.

(51) Int. Cl.$^7$ .......................... B60J 11/00; E04H 15/06; B65D 65/02
(52) U.S. Cl. .................. 296/136; 150/166; 160/370.21; 135/88.09
(58) Field of Search ................................ 296/136, 95.1, 296/97.7, 97.8, 163; 150/166; 244/1 R; 114/361; 403/384, 389; 160/370.21; 135/88.05, 88.09

(56) References Cited

U.S. PATENT DOCUMENTS

| | | | |
|---|---|---|---|
| 2,243,981 A | * | 6/1941 | Rowan ...................... 150/166 |
| 2,570,533 A | | 10/1951 | Elliott |
| 2,619,919 A | * | 12/1952 | Dvorkin ..................... 296/136 |
| 2,639,751 A | | 5/1953 | Flaherty |
| 2,874,709 A | | 2/1959 | Cohen |
| 3,990,463 A | | 11/1976 | Norman |
| 4,216,989 A | | 8/1980 | Tackett |
| 4,273,465 A | | 6/1981 | Schoen |
| 4,294,483 A | * | 10/1981 | Ferris ......................... 296/136 |
| 4,355,839 A | | 10/1982 | Rosen |
| 4,598,883 A | | 7/1986 | Suter |
| 4,834,157 A | | 5/1989 | Smith |
| 4,842,324 A | | 6/1989 | Carden |
| 4,867,216 A | | 9/1989 | McKee |
| 4,938,522 A | * | 7/1990 | Herron et al. .............. 296/136 |
| 4,948,191 A | | 8/1990 | Cao |

(List continued on next page.)

FOREIGN PATENT DOCUMENTS

| | | | |
|---|---|---|---|
| GB | 1559176 | | 1/1980 |
| GB | 2058696 | * | 4/1981 |
| JP | 5-77647 | | 3/1993 |
| JP | 5-294146 | | 11/1993 |

OTHER PUBLICATIONS

Magnetic Heavy Duty Windshield Cover, *Carol Wright Gifts* (advertisement).
Pop–Tent, *TWA Ambassador*, Sep., 1994, p. 14.
The Leader in Automotive Protection, *Covercraft*, 1995, Form 590, pp. 2–23.
New Interior Covers (Blueguard and Stormguard), Beverly Hills Motoring Accessories, 1988.

*Primary Examiner*—D. Glenn Dayoan
*Assistant Examiner*—H. Gutman
(74) *Attorney, Agent, or Firm*—Gerald E. Helget; Nelson R. Capes; Briggs and Morgan

(57) ABSTRACT

A full-body, self-deploying cover for a vehicle is shown. The cover consists of a fabric sheet with a sleeve formed in its periphery. Within the sleeve is an elastic rod with two free ends. The rod is foldable between an expanded state and a stored state. In the expanded state the rod outwardly tensions the periphery of the fabric sheet and forms a semi-rigid frame, with the spring tension of the rod causing the cover to self-deploy. A connector joins the ends of the elastic rod together after the cover is placed over the vehicle, with the rod beneath the vehicle's undercarriage, and the fabric sheet may be tightened securely within the perimeter of the undercarriage.

12 Claims, 7 Drawing Sheets

U.S. PATENT DOCUMENTS

| | | |
|---|---|---|
| 4,952,007 A | 8/1990 | Shahrokh |
| 5,024,262 A | 6/1991 | Huang |
| 5,035,460 A | 7/1991 | Huang |
| 5,115,848 A | 5/1992 | Malone |
| 5,161,849 A | 11/1992 | Holland, Jr. |
| 5,163,461 A | 11/1992 | Ivanovich |
| 5,343,915 A | 9/1994 | Newsome |
| 5,396,917 A | 3/1995 | Hazinski |
| 5,435,362 A | 7/1995 | Chiang |
| 5,490,707 A | 2/1996 | De La Cruz |
| 5,497,819 A | 3/1996 | Chiang |
| 5,547,734 A | 8/1996 | Tusch |
| 5,597,197 A | 1/1997 | Mowar et al. |
| 5,615,923 A | 4/1997 | Madison |
| 5,697,416 A | 12/1997 | Bock |
| 5,845,958 A | 12/1998 | Rudys et al. |
| 5,890,525 A * | 4/1999 | Shores ........................ 150/166 |
| 5,927,793 A | 7/1999 | McGrath, Jr. |
| 6,099,067 A * | 8/2000 | Butterworth ................. 296/136 |
| 6,129,034 A * | 10/2000 | Santa Cruz et al. ......... 114/361 |
| 6,220,263 B1 * | 4/2001 | Randmae ................. 135/88.05 |
| 6,220,648 B1 * | 4/2001 | Daniel ........................ 296/136 |
| 6,325,121 B1 | 12/2001 | Hudnall |
| 6,415,832 B1 * | 7/2002 | Ricks ........................ 150/166 |
| 2001/0045760 A1 * | 11/2001 | Syron ........................ 296/136 |

* cited by examiner

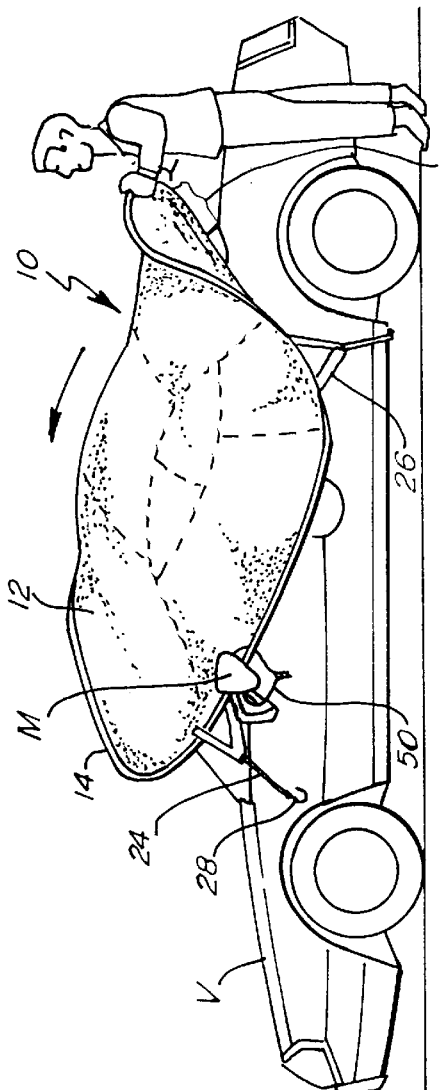
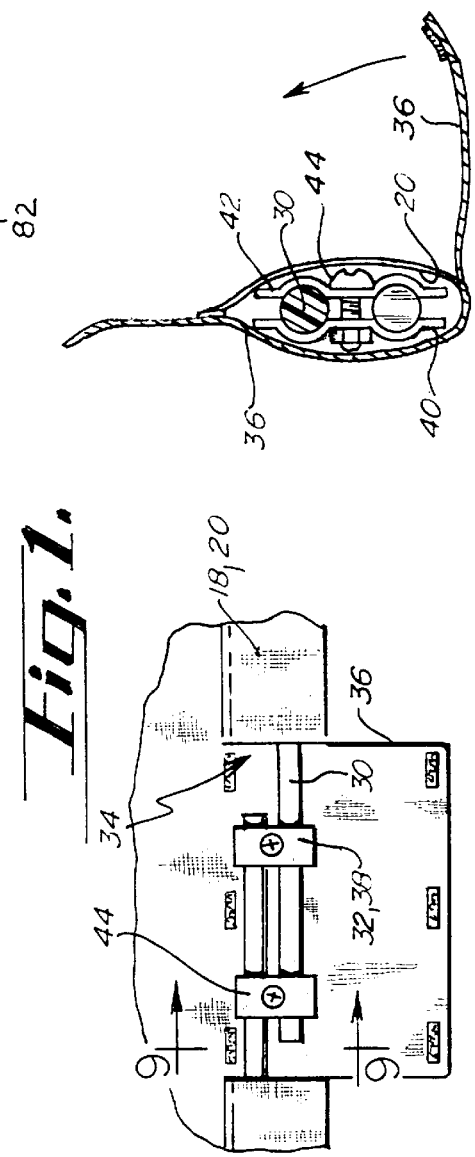
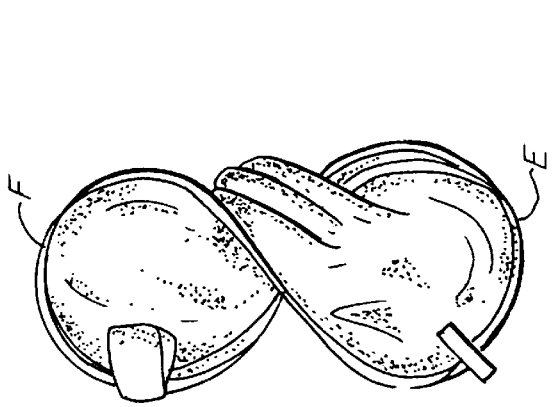

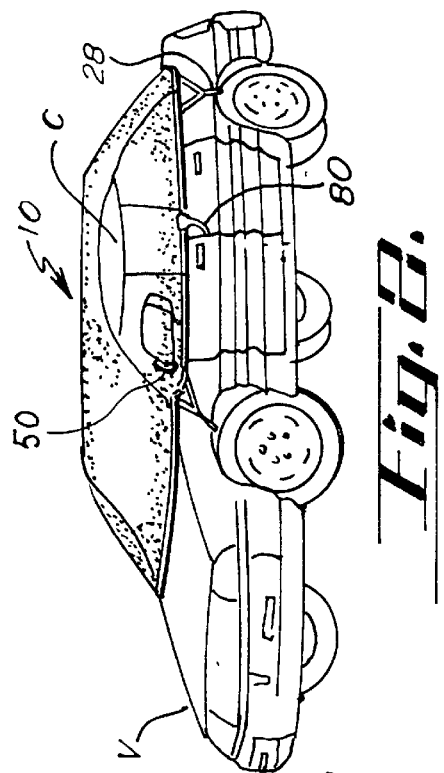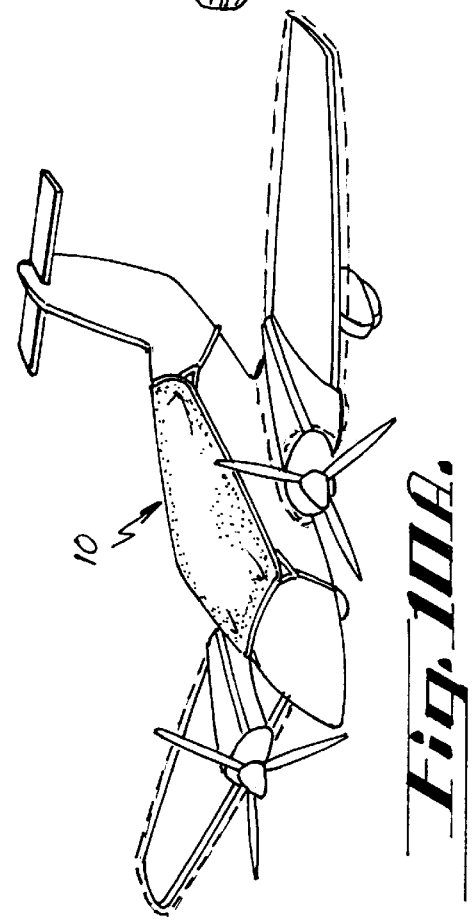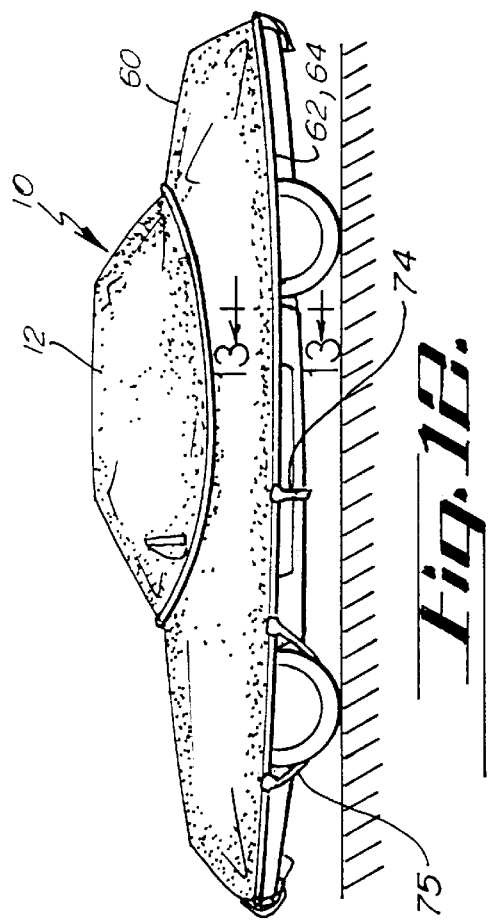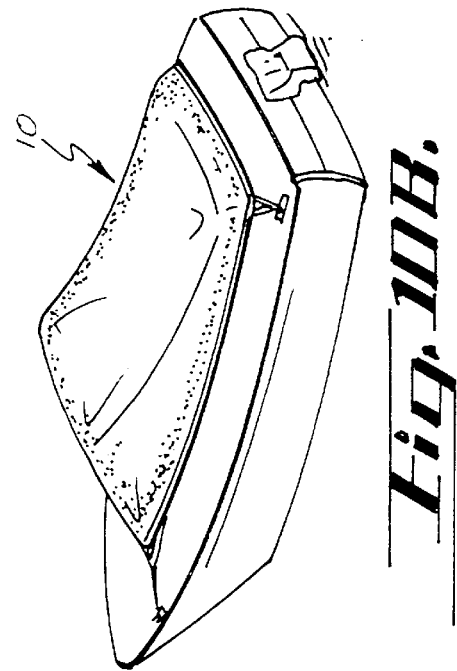

SELF-DEPLOYING VEHICLE COVER WITH UNDERCARRIAGE TIGHTENING

This is a continuation-in-part of U.S. patent application Ser. No. 09/777,414, filed Feb. 6, 2001.

BACKGROUND OF THE INVENTION

Motor vehicles, and particularly privately owned automobiles, are susceptible to being rendered uncomfortable and to being damaged by periodic exposure to the sun and weather. One especially vexing problem for the typical owner of a car is that when parked temporarily in the sun, the passenger compartment quickly becomes quite hot (greenhouse effect). This is very uncomfortable to passengers upon returning to the vehicle. It is also potentially damaging to the car and its contents. Plastic and leather fabrics and coverings are more rapidly aged or dried by exposure to heat or to ultraviolet light which enters the cab. Certain personal property commonly carried in cars, such as magnetic audio tapes, are also quite susceptible to damage from heat.

Other environmental hazards which are desirable to avoid include dust, dirt, rain, snow, frost and ice formation on vehicle windows, wiper blades, door handles and key holes.

Motor vehicle covers have been developed to protect vehicles from these conditions. Some are full body covers, that is, covers which envelope or cover an entire vehicle body. Others are designed specifically to cover only the window area, since both heat and window fouling hazards impinge principally on the cab area of motor vehicles. A cover which covers the windows only, or which covers roof and windows, will be termed a cab cover. A full body cover can be awkward and unwieldy to install, unattractive, and may occupy a large amount of space when stored. In particular, a full body cover must generally be exactly shaped to conform to the vehicle body in order to avoid unsightly bulges and to keep from being blown off the vehicle by the wind.

Previous covers have not found a wide market, principally because they are difficult to put on the vehicle. Even a cab cover must be unfolded, placed around the cab, and secured in place at the same time that the cover has a tendency to move around on the cab or slip off the cab. A full body cover is even more difficult to install, because of the length of the vehicle. The cover must be thrown over the vehicle, one end secured, and then the other end secured. The cover has a tendency to slip off the first end while the other end is being secured.

There is a need for a self-deploying cover with an internal frame that gives the cover sufficient rigidity that the cover can be properly oriented, picked up and placed over the vehicle's cab by one person and remain over the cab without sliding off while the cover is secured to the vehicle, suitably by straps to the wheel wells. However, the semi-rigid frame must be foldable so that the cover takes up a minimum amount of room for storage in the vehicle. Such a cover would enhance the user's lifestyle by providing a cool car with minimal work. There is also a need for a full body cover with similar characteristics. There is also a need for a full body cover which can be tightly secured onto the vehicle for transport of the vehicle by automobile carrier, train, etc.

Although the cover is primarily intended for automobiles, it will also find use on trucks, airplanes, boats, snowmobiles, all-terrain vehicles, personal watercrafts and agricultural equipment.

SUMMARY OF THE INVENTION

A full-body, self-deploying cover for a vehicle. The cover consists of a fabric sheet with a sleeve formed in its periphery. Within the sleeve is an elastic rod with two free ends. The rod is foldable between an expanded state and a stored state. In the expanded state the rod outwardly tensions the periphery of the fabric sheet and forms a semi-rigid frame, with the spring tension of the rod causing the cover to self-deploy. A connector joins the ends of the elastic rod together after the cover is placed over the vehicle, with the rod beneath the vehicle's undercarriage and tightening the fabric sheet securely within the perimeter of the undercarriage.

A principal object and advantage of the present invention is that the cover is easily placed on the vehicle, yet is securely attached under the vehicle's undercarriage so that it cannot fly off when the vehicle is being transported from place to place.

Another principal object and advantage of the present invention is a locking device securing the cover beneath the vehicle's undercarriage, making it impossible to remove the cover without a key.

BRIEF DESCRIPTION OF THE DRAWINGS

FIG. 1 shows the self-deploying cover of the present invention being placed on a vehicle.

FIG. 2 shows the self-deploying cover of the present invention in place on a vehicle.

FIG. 6 shows the folded figure-eight configuration of FIG. 5 being twisted into a second figure-eight configuration.

FIG. 7 shows the figure-eight configuration of FIG. 6 after the loops of the figure-eight have been folded together.

FIG. 8 is a detailed view of a portion of the self-deploying cover of the present invention showing the connectors for joining and adjusting the ends of the rod together and the opening in the sleeve for accessing the end connectors.

FIG. 9 is a cross section along the lines 9—9 of FIG. 8.

FIG. 10A shows the self-deploying cover of the present invention being deployed on an airplane, with self-deploying covers shown on the wings in phantom outline.

FIG. 10B shows the self-deploying cover of the present invention being deployed on a boat.

FIG. 12 shows a third embodiment of the self-deploying cover of the present invention.

DETAILED DESCRIPTION OF THE PREFERRED EMBODIMENT

Figure 5:
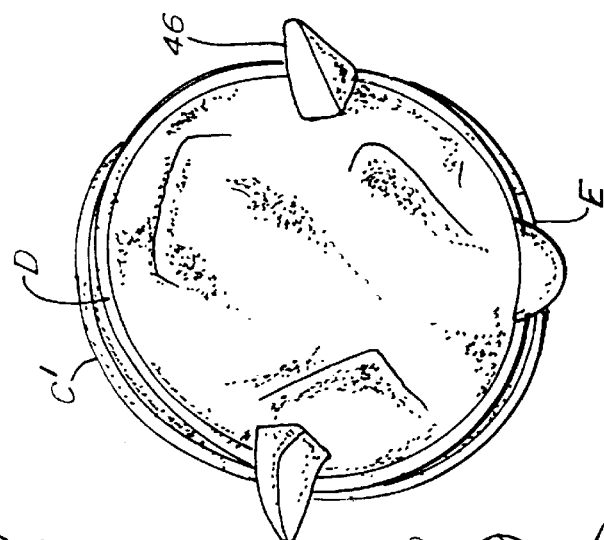
FIG. 5 shows the self-deploying cover of the present invention after the loops of the figure-eight have been folded together.

The self-deploying cover of the present invention is generally shown in the Figures as reference numeral 10.

The self-deploying cover 10 consists of a fabric sheet portion 12 having substantially the general dimensions of the cab C of the vehicle V. Herein the cab C is referred to as consisting of the roof, windshield, and side windows of the vehicle V.

The self-deploying cover 10 also has a collapsible, semi-rigid frame 14 along the periphery or encompassing the sheet portion 12. The frame 14 is sufficiently rigid that the cover can be oriented, lifted up and placed over the vehicle's cab and remain over the cab without sliding off while the cover is secured to the vehicle by one person. More particularly, as shown in FIG. 1, the frame 14 is rigid enough that the cover 10 can be pushed over the cab of the vehicle from the rear of the vehicle in the direction shown by the arrow. Similarly, the cover 10 can be pulled off the cab C. This is completely different from previous covers which must be thrown over the cab from one end or the side of the vehicle and which then have a tendency to slide off the vehicle. The orientation of the front, sides and rear of previous covers was impossible to learn of until the cover had been manually deployed. Instead, the frame 14 causes the cover 10 to properly encompass the cab C of the vehicle and remain in place thereon.

Figure 3:
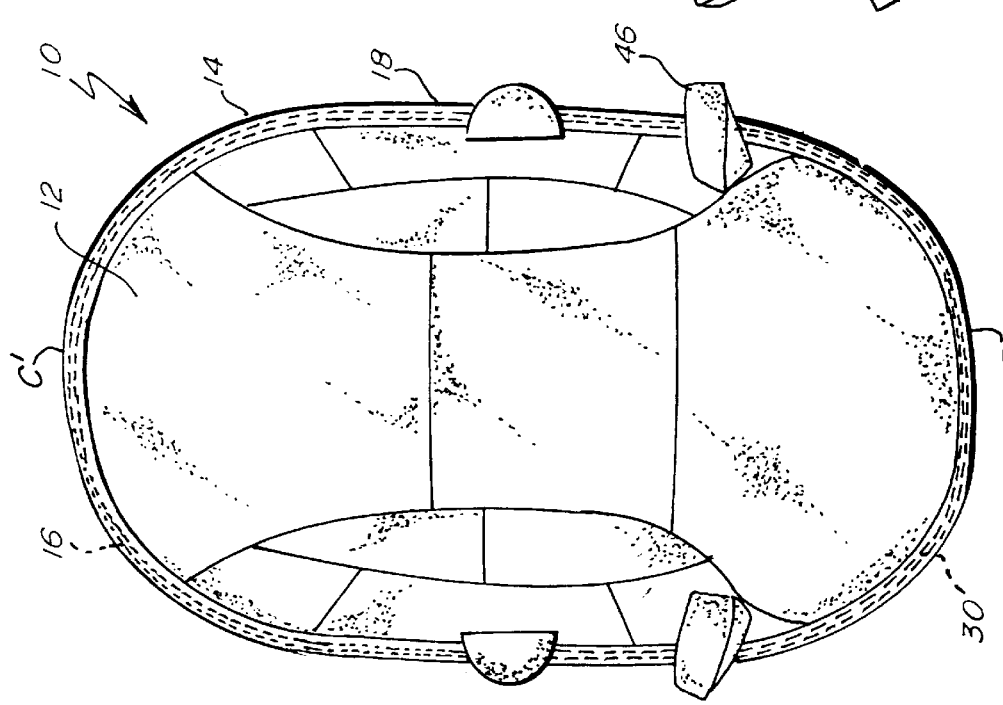
FIG. 3 is a plan view of the self-deploying cover of the present invention in the expanded state.

However, the semi-rigid frame is also collapsible so that the cover takes up a minimum amount of room for storage in the vehicle. The cover can be in an expanded state, as shown in FIG. 3, and may also be in a stored state as shown in FIGS. 5 and 7.

The self-deploying cover 10 also has first spring means 16 for deploying the cover from the stored state to the expanded state. The first spring means 16 makes the cover self-deploying, in that in the stored state the first spring means 16 is compressed and the first spring means 16 causes the cover 10 to self-deploy to the expanded state as the tension of the compressed first spring means 16 is released.

The first spring means 16 may be any type of spring, such as a standard coil spring or the equivalent. Preferably, the sheet portion 12 has a periphery 18 and a sleeve portion 20 is preferably formed within the periphery 18. The first spring means 16 may be contained within the sleeve portion 20.

Figure 4:
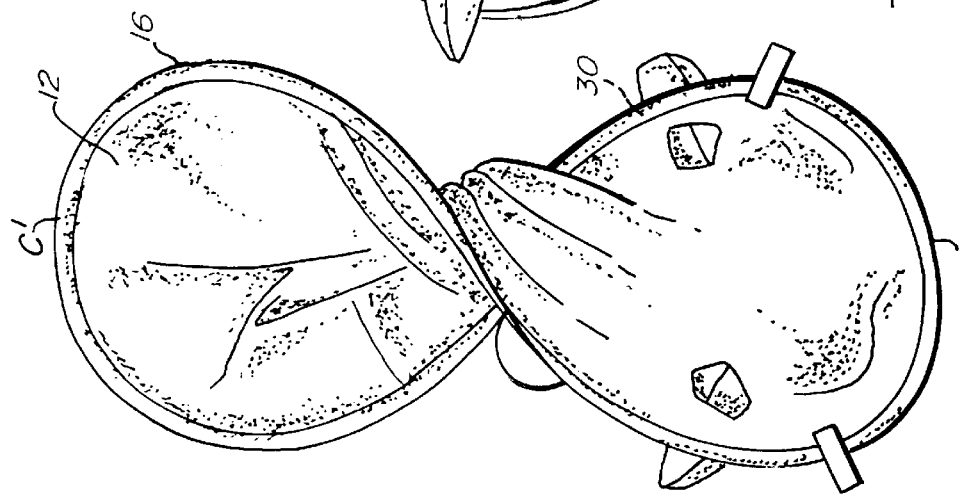
FIG. 4 shows the self-deploying cover of the present invention being twisted into a figure-eight shape for storage.

Preferably, the first spring means 16 is twistable into a first folded figure-eight configuration by twisting the first spring means into a figure-eight with two loops, then folding the two loops together, thereby producing the stored state. This procedure is shown in FIGS. 4 and 5. FIG. 4 shows the first spring means 16 being twisted into a first folded figure-eight configuration. FIG. 5 shows the loops of the figure-eight configuration being folded together so that point D of one loop comes to oppose point C' of the other loop.

The first figure-eight configuration may not be small enough to store the cover 10 in the vehicle. Preferably, the first spring means 16 is therefore further twistable into a second folded figure-eight configuration by twisting the first folded figure-eight configuration into a second figure-eight with two loops, then folding the two loops together, thereby producing the stored state. This procedure is shown in FIGS. 6 and 7. In FIG. 6, the folded figure-eight configuration of FIG. 5 is twisted into a second figure-eight configuration. In FIG. 7, the loops of this second figure-eight configuration are brought together so that point E of one loop comes to oppose point F of the second loop.

It will be recognized that in the stored configuration, the first spring means 16 is compressed. Consequently, when the tension of the compressed first spring means 16 is released, the cover 10 will self-deploy to the expanded position shown in FIG. 3. This may be done, for example, by unfolding the loops of the second figure-eight configuration, then unfolding the loops of the first figure-eight configuration. Alternatively, the tension of the first spring means 16 may be such that the cover 10 may be deployed merely by throwing the cover 10 in its contracted state into the air.

The cover 10 also comprises first connectors 24 for attaching the cover 10 to the vehicle V.

In the case where the vehicle V is an automobile, the first connectors 24 may preferably be adjustable, stretchable or bungee-like straps 24 connected to the sheet portion 12 and clamps 28 on the ends of the straps 24 remote from the sheet portion 12, the clamps 28 engaging the automobile's wheel wells as best seen in FIG. 2. The straps 24 are preferably adjustable to accommodate different vehicle sizes and wheel well positions.

In the preferred embodiment, the first spring means 16 comprises a first elastic rod 30 joined at its ends by a second connector 32 and contained within the sleeve portion 20. The rod 30 is foldable between the expanded state and the stored state and in the expanded state the rod 30 outwardly tensions the periphery 18 of the sheet portion 12. The spring tension of the rod 30 self-deploys the cover 10 as the rod 30 springs from the stored state to the expanded state.

Preferably, the sleeve portion 20 may have a covered opening 34 therein for accessing the second connector 32 and for adjusting the second connector 32 to change the size of the cover 10. The opening 34 ma have a cover 36. The cover 36 may be closed, for example, by a hook-and-loop fastener, (VELCRO) or by snaps or clips.

In the preferred embodiment, the second connector 32 comprises a first clamp 38 with two rod-engaging portions 40, 42. As shown in FIGS. 8 and 9, each end of the rod 30 is held in one of the rod-engaging portions 40, 42. The expanded length of the rod 30 is adjustable by sliding the ends of the rod 30 through the rod-engaging portions 40, 42. In this way, the size of the cover 10 may be slightly adjusted for a tighter or looser fit.

The second connector 32 may also further comprise a second clamp 44 like the first clamp 38, as shown in FIG. 8. In the event the first clamp 38 should loosen or break, the second clamp 44 will still hold the ends of the rod 30 together.

The rod 30 is preferably made of fiberglass, but may also be any other elastic material that will provide a semi-rigid frame, such as steel, aluminum, or graphite. Most preferably, the rod is made of pultruded fiberglass strands bonded together with polyester resin. Pultruding is the process of pulling the fiberglass rovings or strands through a die rather than pushing the strands through the die. This gives the fiber more integrity and strength. The rod is then reinforced by adding a matting around the strands which is coated with the polyester resin. This gives the rod cross-directional strength. This method of manufacture gives the rod a high level of flexibility without the strands breaking down.

The fabric sheet portion 12 is preferably made of a heat-proof and water-proof material. Examples of such materials are nylon and poly-cotton. The fabric sheet portion 12 should also preferably be resistant to ultra-violet light (UV). An example of such UV-resistant materials is the polypropylene fabrics SENTREX or EVOLUTIONTM from Kimberly-Clark of Roswell, Ga., or Sunbrella from Glen Raven Mills, Inc. of Glen Raven, N.C. The fabric sheet portion 12 may also consist of multiple layers of material with various capabilities, such as softness and UV-resistance.

The cover 10 may also have a mirror pocket 46 for engaging the side-view mirror M of the vehicle.

Optionally, a lock may be included with the cover 10 to secure the cover 10 to the vehicle. The lock is preferably a cable lock 50, which is well known, and may be threaded around the mirror pocket 46 and the mirror M.

Figure 14:
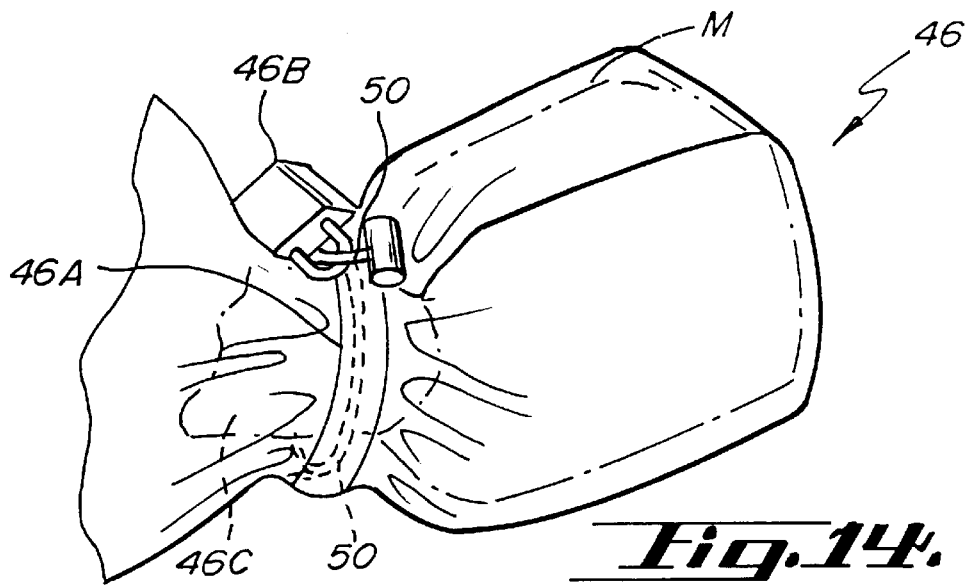
FIG. 14 is a cross section of the mirror pocket of the cover with the mirror shown in phantom and also showing a cable lock.
Figure 15:
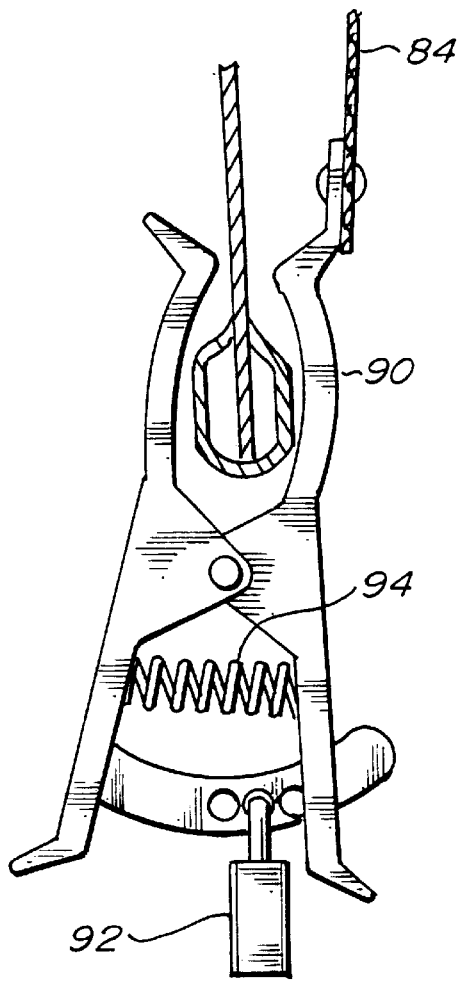
FIG. 15 is a schematic of a clamping connector for securing the cover to a vehicle's wheel well.
Figure 16:
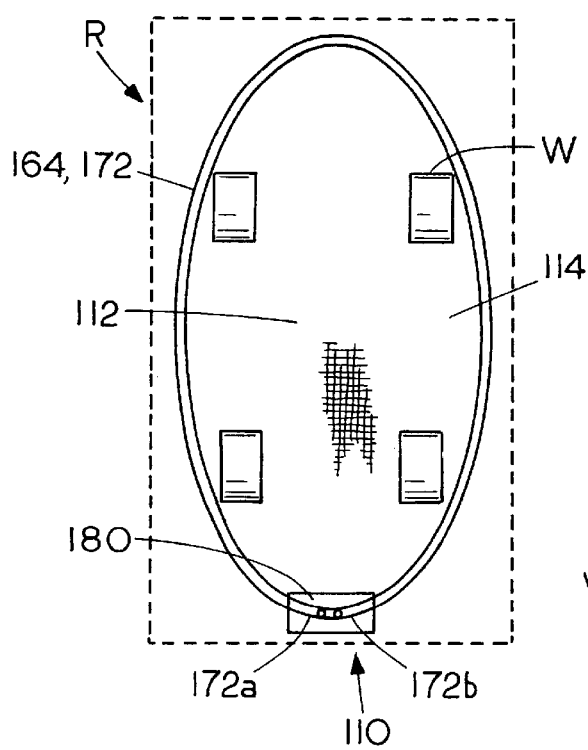
FIG. 16 is a bottom plan view of a full body cover secured to the vehicle beneath the vehicle's undercarriage.

Alternatively, the mirror pocket 46 may have a sleeve 46A therein, and the cable lock 50 resides within the sleeve 46A. A padlock 46B secures the cable tightly around the mirror M. For example, the cable lock 50 may be coiled around the neck 46C of the mirror, as shown in FIG. 14.

In another embodiment, the lock may be a strap 80 attached to the cover 10 and adapted to be secured to the vehicle by closing a door of the vehicle on the strap, thereby locking the cover to the vehicle. One of ordinary skill would recognize that some sort of blockage may be needed to keep the strap 80 from slipping out of the door jamb. Any sort of blockage, such as a knot, enlargement, bracket, etc. may be used.

In another embodiment, the lock may be a strap 82 attached to the cover and adapted to be secured to the vehicle by closing the truck of the vehicle on the strap, thereby locking the cover to the vehicle. One of ordinary skill would recognize that some sort of blockage may be needed to keep the strap 82 from slipping out of the trunk. Any sort of blockage, such as a knot, enlargement, bracket, etc. may be used.

In another embodiment, the lock may be a strap 84 attached to the cover 10 at one end and having a clamping connector 90 at the other end, the clamping connector 90 engaging the vehicle's wheel well, with a padlock 92 for securing the clamping connector 90 to the vehicle's wheel well. Preferably, the clamping connector 90 comprises a spring 94 for biasing the clamping connector against the vehicle's wheel well.

Although the primary purpose of the cover 10 is for use on an automobile, the cover 10 may also be used on an airplane as shown in FIG. 10A or on a boat as shown in FIG. 10B.

Figure 11:
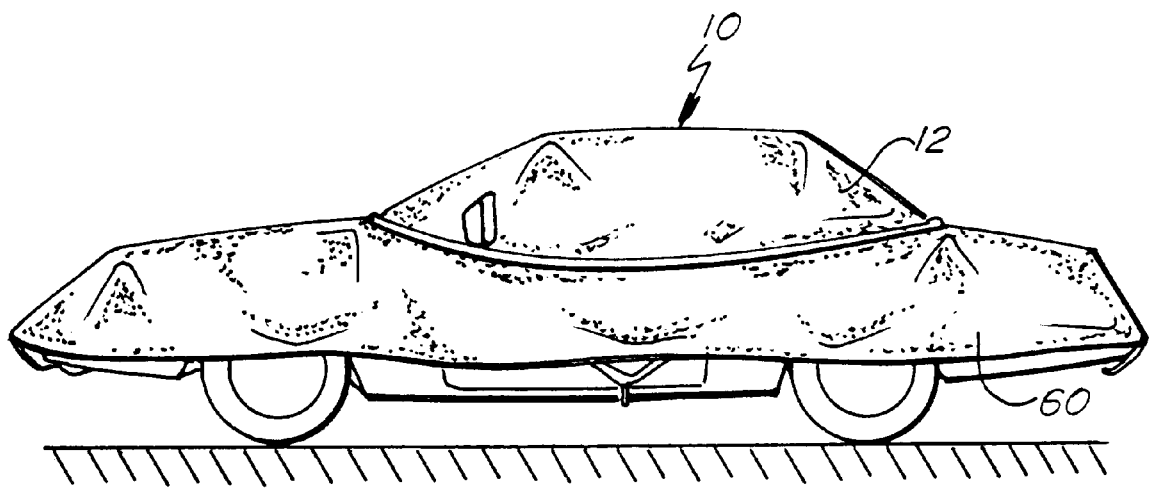
FIG. 11 shows a second embodiment of the self-deploying cover of the present invention.
Figure 13:
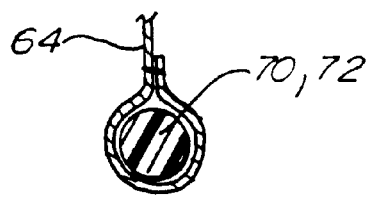
FIG. 13 is a cross section along the line 13 of FIG. 12.

A second embodiment of the cover 10 is shown in FIG. 11. In this second embodiment, a skirt 60 is attached to the sleeve portion 20 and covers further areas of the vehicle.

A third embodiment of the cover 10 is shown in FIG. 12. In this embodiment, the skirt 60 has a border 62. A second sleeve portion 64 is formed in the skirt 60 on the border 62. A second spring means or stretch chord 70 may be contained within the second sleeve portion 64. The second spring means 70 holds the skirt 60 against the vehicle V. The second spring means 70 also makes the cover self-deploying, in that in the stored state the second spring means 70 is compressed and the second spring means 70 causes the skirt 60 to self-deploy to the expanded state as the tension of the compressed second spring means 70 is released.

The second spring means 70 may be any type of spring, such as a standard coil spring or the equivalent.

In the preferred embodiment, the second spring means 70 comprises a second elastic rod 72 joined at its ends and contained within the second sleeve portion 64. The rod 72 is foldable between the expanded state and the stored state and in the expanded state the rod 72 outwardly tensions the border of the skirt 60. The spring tension of the rod 72 self-deploys the skirt 60 as the rod 30 springs from the stored state to the expanded state.

FIG. 12 also shows that the cover 10 may be locked to the vehicle by a non-cutable, adjustable member 74 attached to the rod 72 at either side of the vehicle and passing under the vehicle body. The member 74 may be tightened around the vehicle to keep the skirt 60 from ballooning out away from the vehicle, as well as locking the cover 10 to the vehicle. Alternatively, a cable or strap 75 may be attached to the rod 72 about one or more of vehicle's wheels, and secured with a padlock (not shown).

A full-body self-deploying cover 110 for a vehicle is shown in FIGS. 16–19. As can be seen in the Figures, the vehicle has an undercarriage R with a perimeter P (shown generally as dashed lines). The purpose of the full-body cover is to provide a cover for the entire vehicle body that can be secured underneath the vehicle's undercarriage R within the perimeter P, making it impossible for the cover to be removed either accidentally or deliberately without authorization.

To accomplish this purpose, the cover 110 comprises a fabric sheet 112 having a periphery 114. A sleeve 164 is formed in the sheet 112 adjacent the periphery 114. An elastic rod 172 is contained within the sleeve 164. The rod 172 has a first end 172a and a second end 172b.

A connector 180 is adapted to join the first end 172a to the second end 172b after the cover is placed over the vehicle. The connector 180 joins the ends 172a, 172b together under the vehicle's undercarriage R. Thus, the cover may be placed over the vehicle and the two ends of the rod 172 brought together under the vehicle's undercarriage R, thereby tightening the fabric sheet 112 beneath the vehicle's undercarriage within the perimeter P of the undercarriage. Of course, the fabric sheet will lie outside the vehicle's wheels W.

Figure 17:
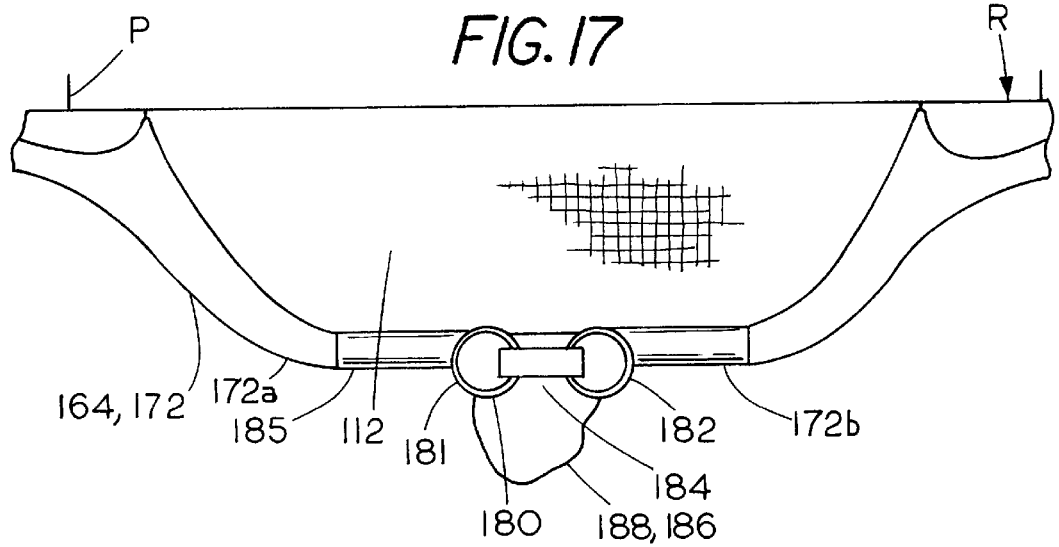
FIG. 17 is an end view of the full body cover of FIG. 16.

As best seen in FIG. 17, the connector may preferably comprise rings 181, 182 secured to the first end 172a and second end 172b, respectively, with a locking device 184 securing the two rings 181, 182 together. Most preferably, tubing 185 is secured to the ends 172a, 172b and the rings 181, 182 are passed through the tubing 185.

In addition, the cover 110 may have a means 186 securing the first end 172a to the second end 172b when the cover 110 is not on the vehicle. That means 186 is preferably a security cable 188. The means 186 prevents the ends 172a, 172b from inadvertently retracting into the sleeve 164.

Figure 18:
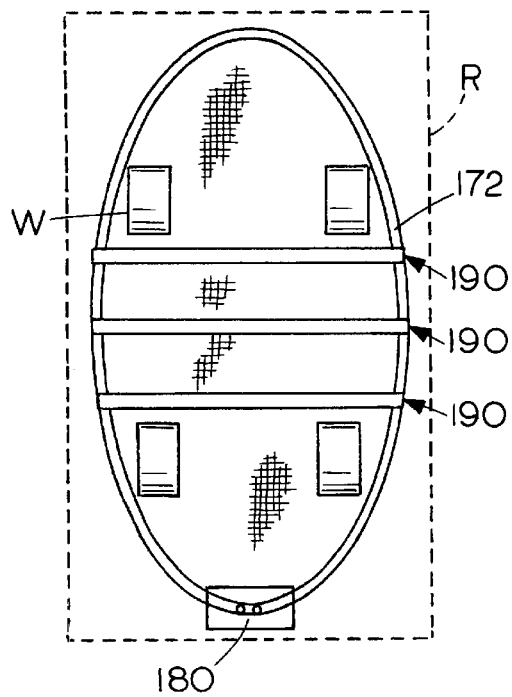
FIG. 18 is a bottom plan view of another embodiment of the full body cover of FIG. 16.

To provide an even tighter fit of the cover under the vehicle, the cover 110 also may comprise at least one elastic member 190 attached to the rod 172 across the vehicle's undercarriage R, as best seen in FIG. 18.

Figure 19:
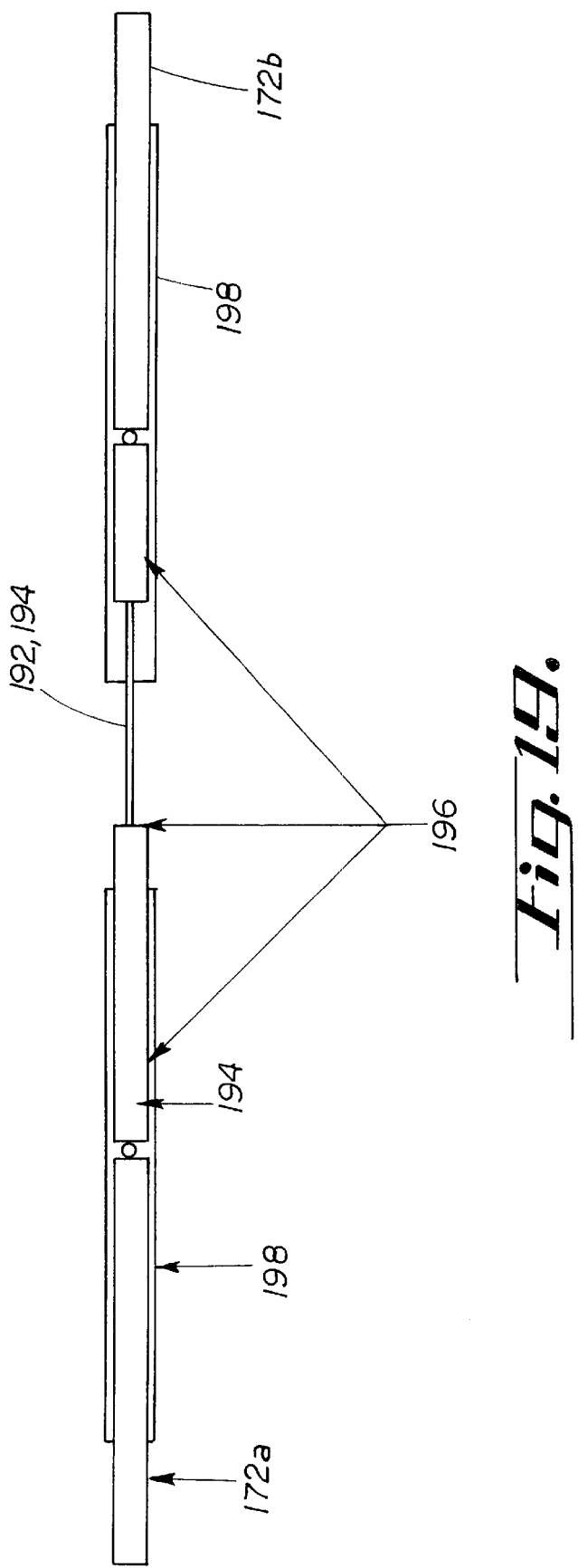
FIG. 19 is a detailed schematic of an embodiment of the full body cover of FIG. 16, showing a shock cord securing mechanism.

To allow the cover 110 to be readily adapted to a variety of vehicles, the cover 110 may also comprise an elastic member 192 securing the first end 172a to the second end 172b, as best seen in FIG. 19. The elastic member 192 is preferably a shock cord 194. Mating adapters 196 attached to the first end 172a and second end 172b may be used, connected together by the elastic member 192. Outside hollow sleeves 198 engage both the ends 172a, 172b and the mating adapters 196. As can be appreciated in FIG. 19, the mating adapters 196 telescope within the hollow sleeves 198, biased by the elastic member 192, so that the hollow sleeves 198 are brought together.

It will be seen that the elastic member allows the expansion of the periphery of the fabric sheet 112 to adjust to the perimeters of the undercarriage of various vehicles. The expansion and contraction allows the elastic rod 172 to fit over the vehicle and then tighten to a smaller circumference than that of the vehicle's body. The result is a self-deploying cover 110 that can be secured (and locked) in a configuration smaller than the vehicle body above it. If the rod 172 is locked in the closed configuration, the cover 110 is impossible to remove without cutting through the rod and connector.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A full-body, self-deploying cover for a vehicle, the vehicle having an undercarriage, the undercarriage having a perimeter, the cover comprising:
    (a) a fabric sheet having a periphery;
    (b) a sleeve formed in the sheet adjacent the periphery of the sheet;
    (c) an elastic rod having a first end and a second end and contained within the sleeve and foldable between an expanded state and a stored state, wherein in the expanded state the rod outwardly tensions the periphery of the sheet and forms a semi-rigid frame and wherein the spring tension of the rod self-deploys the cover as the rod springs from the stored state to the expanded state;
    (d) a connector adapted to join the ends of the elastic rod together under the vehicle's undercarriage, whereby the fabric sheet is tightened securely beneath the vehicle's undercarriage within the perimeter of the undercarriage; and
    (e) a lock engaging the connector and preventing removal of the cover from the vehicle without cutting through the rod and the connector.

2. The self-deploying cover of claim 1, further comprising a means for securing the first end of the rod to the second end of the rod when the cover is off the vehicle.

3. The self-deploying cover of claim 2, wherein the means for securing further comprises a cable.

4. The self-deploying cover of claim 1, further comprising at least one elastic member attached to the rod across the vehicle's undercarriage.

5. The self-deploying cover of claim 1, further comprising an elastic member securing the first end of the rod to the second end of the rod.

6. The self-deploying cover of claim 5, wherein the elastic member is a shock cord.

7. The self-deploying cover of claim 5, further comprising mating adapters attached to the first end and the second end of the rod.

8. The self-deploying cover of claim 1, wherein the rod is twistable into a first folded figure-eight configuration by twisting the rod into a figure-eight with two loops, then folding the two loops together, thereby producing the stored state.

9. The self-deploying cover of claim 8, wherein the rod is further twistable into a second folded figure-eight configuration by twisting the first folded figure-eight configuration into a second figure-eight with two loops, then folding the two loops together, thereby producing the stored state.

10. The self-deploying cover of claim 1, wherein the rod is made of fiberglass.

11. The self-deploying cover of claim 1, wherein the fabric sheet is made of a water-proof material.

12. The self-deploying cover of claim 1, wherein the vehicle is an automobile.

* * * * *